(12) United States Patent
Kang et al.

(10) Patent No.: US 7,904,517 B2
(45) Date of Patent: Mar. 8, 2011

(54) CHALLENGE RESPONSE SYSTEMS

(75) Inventors: Nina W Kang, Brooklyn, NY (US); Joshua T Goodman, Redmond, WA (US); Robert L Rounthwaite, Fall City, WA (US); Josh Benaloh, Redmond, WA (US); Elissa E Murphy, Seattle, WA (US); Manav Mishra, Kirkland, WA (US); Gopalakrishnan Seshadrinathan, Redmond, WA (US); Derek M Hazeur, Redmond, WA (US); Ryan C Colvin, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 1221 days.

(21) Appl. No.: 10/914,325

(22) Filed: Aug. 9, 2004

(65) Prior Publication Data

US 2006/0031338 A1    Feb. 9, 2006

(51) Int. Cl.
    *G06F 15/16*    (2006.01)
    *G06Q 20/00*    (2006.01)

(52) U.S. Cl. .......................................... 709/206; 705/67

(58) Field of Classification Search .................... 705/67; 709/206
    See application file for complete search history.

(56) References Cited

U.S. PATENT DOCUMENTS

| | | |
|---|---|---|
| 5,377,354 A | 12/1994 | Scannell et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 6,003,027 A | 12/1999 | Prager |
| 6,023,723 A | 2/2000 | McCormick et al. |
| 6,041,321 A | 3/2000 | Earl et al. |
| 6,047,242 A | 4/2000 | Benson |

(Continued)

FOREIGN PATENT DOCUMENTS

EP    413 537    2/1991

(Continued)

OTHER PUBLICATIONS

Federal Trade Commission. "False Claims in Spam", A report by the FTC's division of marketing practices, Apr. 30, 2003, http://www.ftc.gov/reports/spam/030429spamreport.pdf.

(Continued)

*Primary Examiner* — George C Neurauter, Jr.
*Assistant Examiner* — Anish Sikri
(74) *Attorney, Agent, or Firm* — Shook, Hardy & Bacon L.L.P.

(57) ABSTRACT

Disclosed are systems and methods that facilitate securing communication channels used in a challenge-response system to mitigate spammer intrusion or deception. The systems and methods make use of unique IDs that can be added to outbound messages originating from a sender, a recipient, and a third-party server. The IDs can be correlated according to the relevant parties. Thus, for example, a sender can add a signed ID to an outgoing message. A challenge sent back to the sender for that particular message can echo the same ID or a new ID derived from the original ID to allow a sender to verify that the challenge corresponds to an actual message. The IDs can include cookies as well to facilitate correlation of messages and to facilitate the retrieval of messages once a sender is determined to be legitimate.

36 Claims, 9 Drawing Sheets

U.S. PATENT DOCUMENTS

| | | | |
|---|---|---|---|
| 6,052,709 | A | 4/2000 | Paul |
| 6,072,942 | A | 6/2000 | Stockwell et al. |
| 6,074,942 | A | 6/2000 | Stockwell et al. |
| 6,101,531 | A | 8/2000 | Eggleston et al. |
| 6,112,227 | A | 8/2000 | Heiner |
| 6,122,657 | A | 9/2000 | Hoffman, Jr. et al. |
| 6,161,130 | A | 12/2000 | Horvitz et al. |
| 6,167,434 | A | 12/2000 | Pang |
| 6,192,360 | B1 | 2/2001 | Dumais et al. |
| 6,199,102 | B1 | 3/2001 | Cobb |
| 6,266,692 | B1 | 7/2001 | Greenstein |
| 6,308,273 | B1 | 10/2001 | Goertzel et al. |
| 6,314,421 | B1 | 11/2001 | Sharnoff et al. |
| 6,321,267 | B1 | 11/2001 | Donaldson |
| 6,327,617 | B1 | 12/2001 | Fawcett |
| 6,330,590 | B1 | 12/2001 | Cotten |
| 6,351,740 | B1 | 2/2002 | Rabinowitz |
| 6,370,526 | B1 | 4/2002 | Agrawal et al. |
| 6,393,465 | B2 | 5/2002 | Leeds |
| 6,421,709 | B1 | 7/2002 | McCormick et al. |
| 6,424,997 | B1 | 7/2002 | Buskirk, Jr. et al. |
| 6,434,600 | B2 | 8/2002 | Waite et al. |
| 6,453,327 | B1 | 9/2002 | Nielsen |
| 6,477,551 | B1 | 11/2002 | Johnson et al. |
| 6,484,197 | B1 | 11/2002 | Donohue |
| 6,484,261 | B1 | 11/2002 | Wiegel |
| 6,505,250 | B2 | 1/2003 | Freund et al. |
| 6,546,416 | B1 | 4/2003 | Kirsch |
| 6,592,627 | B1 | 7/2003 | Agrawal et al. |
| 6,615,242 | B1 | 9/2003 | Riemers |
| 6,633,855 | B1 | 10/2003 | Auvenshine |
| 6,643,686 | B1 | 11/2003 | Hall |
| 6,684,201 | B1 | 1/2004 | Brill |
| 6,691,156 | B1 | 2/2004 | Drummond et al. |
| 6,701,350 | B1 | 3/2004 | Mitchell |
| 6,701,440 | B1 | 3/2004 | Kim et al. |
| 6,728,690 | B1 | 4/2004 | Meek et al. |
| 6,732,149 | B1 | 5/2004 | Kephart |
| 6,732,157 | B1 | 5/2004 | Gordon et al. |
| 6,732,273 | B1 | 5/2004 | Byers |
| 6,742,047 | B1 | 5/2004 | Tso |
| 6,748,422 | B2 | 6/2004 | Morin et al. |
| 6,751,348 | B2 | 6/2004 | Buzuloiu et al. |
| 6,757,830 | B1 | 6/2004 | Tarbotton et al. |
| 6,768,991 | B2 | 7/2004 | Hearnden |
| 6,775,704 | B1 | 8/2004 | Watson et al. |
| 6,779,021 | B1 | 8/2004 | Bates et al. |
| 6,785,820 | B1 | 8/2004 | Muttik |
| 6,842,773 | B1 | 1/2005 | Ralston et al. |
| 6,853,749 | B2 | 2/2005 | Watanabe et al. |
| 6,915,334 | B1 | 7/2005 | Hall |
| 6,920,477 | B2 | 7/2005 | Mitzenmacher |
| 6,928,465 | B2 | 8/2005 | Earnest |
| 6,971,023 | B1 | 11/2005 | Makinson et al. |
| 7,003,555 | B1 | 2/2006 | Jungck |
| 7,032,030 | B1 | 4/2006 | Codignotto |
| 7,051,077 | B2 | 5/2006 | Lin |
| 7,117,358 | B2 | 10/2006 | Bandini et al. |
| 7,146,402 | B2 | 12/2006 | Kucherawy |
| 7,155,243 | B2 | 12/2006 | Baldwin et al. |
| 7,155,484 | B2 | 12/2006 | Malik |
| 7,188,369 | B2 | 3/2007 | Ho et al. |
| 7,219,148 | B2 | 5/2007 | Rounthwaite et al. |
| 7,249,162 | B2 | 7/2007 | Rounthwaite et al. |
| 7,263,607 | B2 | 8/2007 | Ingerman et al. |
| 7,293,063 | B1 | 11/2007 | Sobel |
| 7,320,020 | B2 | 1/2008 | Chadwick et al. |
| 7,359,941 | B2 | 4/2008 | Doan et al. |
| 7,366,761 | B2 | 4/2008 | Murray et al. |
| 2001/0046307 | A1 | 11/2001 | Wong |
| 2002/0016956 | A1 | 2/2002 | Fawcett |
| 2002/0059425 | A1 | 5/2002 | Belfiore et al. |
| 2002/0073157 | A1 | 6/2002 | Newman et al. |
| 2002/0091738 | A1 | 7/2002 | Rohrabaugh et al. |
| 2002/0124025 | A1 | 9/2002 | Janakiraman et al. |
| 2002/0129111 | A1 | 9/2002 | Cooper |
| 2002/0147782 | A1 | 10/2002 | Dimitrova et al. |
| 2002/0174185 | A1 | 11/2002 | Rawat et al. |
| 2002/0184315 | A1 | 12/2002 | Earnest |
| 2002/0199095 | A1 | 12/2002 | Bandini et al. |
| 2003/0009495 | A1 | 1/2003 | Adjaoute |
| 2003/0009698 | A1 | 1/2003 | Lindeman et al. |
| 2003/0016872 | A1 | 1/2003 | Sun |
| 2003/0037074 | A1 | 2/2003 | Dwork et al. |
| 2003/0041126 | A1 | 2/2003 | Buford et al. |
| 2003/0088627 | A1 | 5/2003 | Rothwell et al. |
| 2003/0149733 | A1 | 8/2003 | Capiel |
| 2003/0167311 | A1 | 9/2003 | Kirsch |
| 2003/0191969 | A1 | 10/2003 | Katsikas |
| 2003/0204569 | A1 | 10/2003 | Andrews et al. |
| 2003/0320054 | | 10/2003 | Cheng et al. |
| 2003/0229672 | A1 | 12/2003 | Kohn |
| 2004/0003283 | A1 | 1/2004 | Goodman et al. |
| 2004/0015554 | A1 | 1/2004 | Wilson |
| 2004/0019650 | A1 | 1/2004 | Auvenshine |
| 2004/0054887 | A1 | 3/2004 | Paulsen et al. |
| 2004/0073617 | A1 | 4/2004 | Milliken et al. |
| 2004/0083270 | A1 | 4/2004 | Heckerman et al. |
| 2004/0093371 | A1 | 5/2004 | Burrows et al. |
| 2004/0139160 | A1 | 7/2004 | Wallace et al. |
| 2004/0139165 | A1 | 7/2004 | McMillan et al. |
| 2004/0148330 | A1 | 7/2004 | Alspector et al. |
| 2004/0177120 | A1 | 9/2004 | Kirsch |
| 2004/0181585 | A1* | 9/2004 | Atkinson et al. ............. 709/206 |
| 2004/0199585 | A1 | 10/2004 | Wang |
| 2004/0199594 | A1 | 10/2004 | Radatti et al. |
| 2004/0210640 | A1 | 10/2004 | Chadwick et al. |
| 2004/0215977 | A1 | 10/2004 | Goodman et al. |
| 2004/0255122 | A1 | 12/2004 | Ingerman et al. |
| 2004/0260776 | A1 | 12/2004 | Starbuck et al. |
| 2005/0015455 | A1 | 1/2005 | Liu |
| 2005/0050150 | A1 | 3/2005 | Dinkin |
| 2005/0060643 | A1 | 3/2005 | Glass et al. |
| 2005/0076084 | A1 | 4/2005 | Loughmiller et al. |
| 2005/0080855 | A1 | 4/2005 | Murray |
| 2005/0080889 | A1 | 4/2005 | Malik et al. |
| 2005/0081059 | A1 | 4/2005 | Bandini et al. |
| 2005/0091321 | A1 | 4/2005 | Daniell et al. |
| 2005/0097174 | A1 | 5/2005 | Daniell |
| 2005/0102366 | A1 | 5/2005 | Kirsch |
| 2005/0114452 | A1 | 5/2005 | Prakash |
| 2005/0120019 | A1 | 6/2005 | Rigoutsos et al. |
| 2005/0159136 | A1 | 7/2005 | Rouse et al. |
| 2005/0160148 | A1 | 7/2005 | Yu |
| 2005/0165895 | A1 | 7/2005 | Rajan et al. |
| 2005/0182735 | A1* | 8/2005 | Zager et al. ..................... 705/67 |
| 2005/0188023 | A1 | 8/2005 | Doan et al. |
| 2005/0204159 | A1 | 9/2005 | Davis et al. |
| 2005/0228899 | A1 | 10/2005 | Wendkos et al. |
| 2006/0031303 | A1 | 2/2006 | Pang |
| 2006/0031306 | A1 | 2/2006 | Haverkos |
| 2006/0031319 | A1* | 2/2006 | Nelson et al. ................. 709/206 |
| 2006/0036701 | A1 | 2/2006 | Bulfer et al. |
| 2006/0123083 | A1 | 6/2006 | Goutte et al. |
| 2006/0265498 | A1 | 11/2006 | Turgeman et al. |
| 2007/0101423 | A1 | 5/2007 | Oliver et al. |
| 2007/0130350 | A1 | 6/2007 | Alperovitch et al. |
| 2007/0130351 | A1 | 6/2007 | Alperovitch et al. |
| 2007/0133034 | A1 | 6/2007 | Jindal et al. |
| 2008/0104186 | A1 | 5/2008 | Wieneke et al. |

FOREIGN PATENT DOCUMENTS

| | | |
|---|---|---|
| EP | 720 333 | 7/1996 |
| EP | 1376427 | 3/2003 |
| EP | 1376427 A2 | 1/2004 |
| EP | 1376427 A3 | 1/2004 |
| WO | WO 96/35994 | 11/1996 |
| WO | 9967731 | 12/1999 |
| WO | WO 02/071286 | 9/2002 |
| WO | 03/054764 | 7/2003 |
| WO | WO 2004/059506 | 7/2004 |

OTHER PUBLICATIONS

Hansell. "Internet is losing ground in battle against spam", The New York Times: Technology section, Apr. 22, 2003.

European Search report dated Feb. 23, 2007, mailed Feb. 28, 2007 for

European Patent Application Serial No. 05105308, 4 pages.
European Search Report dated Jul. 5, 2006, mailed Jul. 24, 2006 for European Application No. EP 06 01 2631, 3 pages.
International Search Report dated Jan. 17, 2006, mailed Jan. 31, 2006, for PCT Application Serial No. PCT/US04/05501, 2 Pages.
Written Opinion of the Internatioanl Preliminary Examining Authority mailed Nov. 30, 2005 for PCT/US03/41526, 5 pages.
U.S. Appl. No. 10/208,150, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "C4.5: Programs for Machine Learning." Morgan Kaufmann, San Francisco, CA (1993).
Hayes, Brian."Spam, Spam, Spam, Lovely Spam." American Scientist Online, Jun. 30, 2003. pp. 1-6, vol. 91.
Partial European Search Report, EP05100847, mailed Jun. 21, 2005, 5 pages.
European Search Report, dated Jun. 9, 2005, mailed Aug. 22, 2005 for European Patent Application Serial No. EP04011978, 12 pages.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
Cynthia Dwork, et al., Pricing Via Processing or Combatting Junk Mail, Presented at Crypto '92, 1992, pp. 1-11.
Thorsten Joachims, Text Categorization with Support Vector Machines: Learning with Many Relevant Features; LS-8 Report 23, Nov. 1997, 18 pages.
Daphne Koller, et al., Hierarchically Classifying Doucments Using Very Few Words, In ICML-97: Proceedings of the Fourteenth International Conference on Machine Learning, San Francisco, CA, USA, 1997, 9 pages.
Ellen Spertus, Smokey: Automatic Recognition of Hostile Messages, Proceedings of the Conference on Innovative Applications in Artificial Intelligence (IAAI), 1997, 8 pages.
Hinrich Schutze, et al., A Comparison of Classifiers and Document Representations for the Routing Problem, Proceedings of the 18th Annual International ACM SIGIR Conference on Research and Development in Information Retrieval, Jul. 9-13, 1995, pp. 229-237.
Yiming Yang, et al., A Comparative Study on Feature Selection in Text Categorization, Carnegie Mellon University, 1995, 9 pages.
Yiming Yang, et al., An Example-Based Mapping Method for Text Categorization and Retrieval, ACM Transactions on Information Systems, Jul. 1994, pp. 252-277, vol. 12-No. 3.
David D. Lewis, et al., A Comparison of Two Learning Algorithms for Text Categorization, Third Annual Symposium on Document Analysis and Information Retrieval, Apr. 11-13, 1994, pp. 81-93.
Mehran Sahami, Learning Limited Dependence Bayesian Classifiers, In KDD-96: Proceedings of the Second International Conference on Knowledge Discovery and Data Mining, 1996, pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.

Makoto Iwayama, et al., Hierarchical Bayesian Clustering for Automatic Text Classifiation, Natural Language, 1995, pp. 1322-1327.
David D. Lewis, An Evaluation of Phrasal and Clustered Representations on a Text Categorization Task, 15th Annual International SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Y. H. Li, et al., Classification of Text Documents, The Computer Journal, vol. 41, No. 8, 1998; pp. 537-546.
Juha Takkinen, et al., CAFE: A Conceptual Model for Managing Information in Electronic Mail, Laboratory for Intelligent Information Systems, Department of Computer and Information Science, Linkoping University, Sweden, Conference on System Sciences, 1998 IEEE.
Jacob Palme, et al., Issues When Designing Filters In Messaging Systems, Computer Communications, 1996, pp. 95-101, Stockholm, Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Bayesian Approach to Filtering Junk E-Mail, AAAI Workshop on Learning for Text Categorization, Jul. 1998, 8 pages, Madison, Wisconsin, USA.
David Madigan, Statistics and The War on Spam, Rutgers University, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
Thorsten Joachims, Transductive Inference for Text Classification Using Support Vector Machines, In Proceddings of the 16th International Conference on Machine Learning, 1999, pp. 200-209, San Francisco, CA, USA.
John Wong, Preventing Spams and Relays, Linux Journal, Dec. 1998, 6 pages, vol. 1998 Issue 56es, Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11.
Eric Allman, Spam, Spam, Spam, Spam, Spam, the FTC, and Spam, Queue, Sep. 2003, pp. 62-69, vol. 1 Issue 6.
Tom Fawcett, "In vivo" Spam Filtering: A Challenge Problem for KDD, SIGKDD Explorations, Dec. 2003, pp. 140-148, vol. 5 Issue 2.
J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.
S. Argamon, et al., Routing documents according to style, In First International Workshop on Innovative Information Systems, 1998, 8 pages.
K. Mock, An Experimental Framework for Email Categorization and Management, Proceedings of the 24th Annual International ACM SIGIR Conference, 2001, pp. 392-393.
Jose Maria Gomez Hidalgo, Evaluating Cost-Sensitive Unsolicited Bulk Email Categorization, SAC 2002, 2002, pp. 615-620, Madrid, Spain.
A.Z. Broder, et al. Syntactic Clustering of the Web, SRC Technical Note, Digital Corporation, Jul. 25, 1997, 13 pages.
I. Androutsopoulos,et al., An Experimental Comparison of Naive Bayesian and Keyword-based Anti-spam Filtering with Personal E-mail Messages, Proceedings of the 23rd ACM SIGIR Conference, 2000, pp. 160-167.
P. Pantel, et al., SpamCop: A Spam Classification & Organization Program, In Proc. AAAI-1998 Workshop on Learning for Text Categorization, 1998, 8 pages.

G. Manco, et al., Towards an Adaptive Mail Classifier, In Proc. of Italian Association for Artificial Intelligence Workshop, 2002, 12 pages.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI Oct. 2, 2002, pp. 111-118, Arhus, Denmark.

Lorrie Faith Cranor, et al., Spam!, Communications of the ACM, 1998, pp. 74-83, vol. 41-No. 8.

Ion Androutsopoulos, et al., Learning to Filter Spam E-mail: A Comparison of a Naive Bayesian and a Memory-based Approach, 4th PKDD's Workshop on Machine Learning and Textual Information Access, 2000, 13 pages.

Fabrizio Sebastiani, Machine Learning in Automated Text Catergorization, ACM Computing Surveys, 2002, pp. 1-47, vol. 34-Issue 1.

Kevin R. Gee, Using Latent Semantic Indexing to Filter Spam, University of Texas-Arlington, 2003, 5 pages.

P.Y. Simard, et al. Using Character Recognition and Segmentation to Tell Computer from Humans. International Conference on Document Analysis and Recogntion (ICDAR), IEEE Computer Society, Los Alamitos, pp. 418-423, 2003.

S. Li and H. Shum. Secure Human-Computer Identification against Peeping: A Survey. Technical Report, Microsoft Research, 2003. 53 pages.

D.A. Turner and D.M. Havey. Controlling Spam through Lightweight Currency. In Proc. of the Hawaii International Conference on Computer Sciences, Jan. 2004. 9 pages.

D. Turner and N. Deng. Payment-based Email. 5th International Conference on Software Engineering, Artificial Intelligence, Networking, and Parallel/Distributed Computing, Jun. 2004. 7 pages.

"MIME", The Microsoft Computer Dictionary. 5th ed. Redmond, WA; Microsoft Press. May 1, 2002.

Ron White, How Computers Work, 2004, QUE Publishing, pp. 238-239.

Michael S. Mimoso, "Quick Takes: Image Analysis, Filtering Comes to E-mail Security", http://searchsecurity.techtarget.com/originalContent.html (Feb. 5, 2002).

"Clearswift Announces the Most Complete e-Policy-Based Email Content Security Product for Service Providers", http://www.clearswift.com/news/item.aspx?ID=144. (Oct. 12, 2002).

OA dated Oct. 8, 2008 for U.S. Appl. No. 11/743,466, 43 pages.
OA dated Nov. 28, 2008 for U.S. Appl. No. 10/799,455, 53 pages.
OA dated Nov. 6, 2008 for U.S. Appl. No. 10/799,992, 46 pages.
OA dated Jan. 16, 2009 for U.S. Appl. No. 10/917,077, 34 pages.
European Search Report dated Apr. 6, 2006 and mailed Apr. 6, 2006 for EP 04102242, 3 pages.

Graham. "The Future of SPAM" (2003) Computer Journal, CSI Computer Security Institute, vol. 19, No. 1, 6 pages.

* cited by examiner

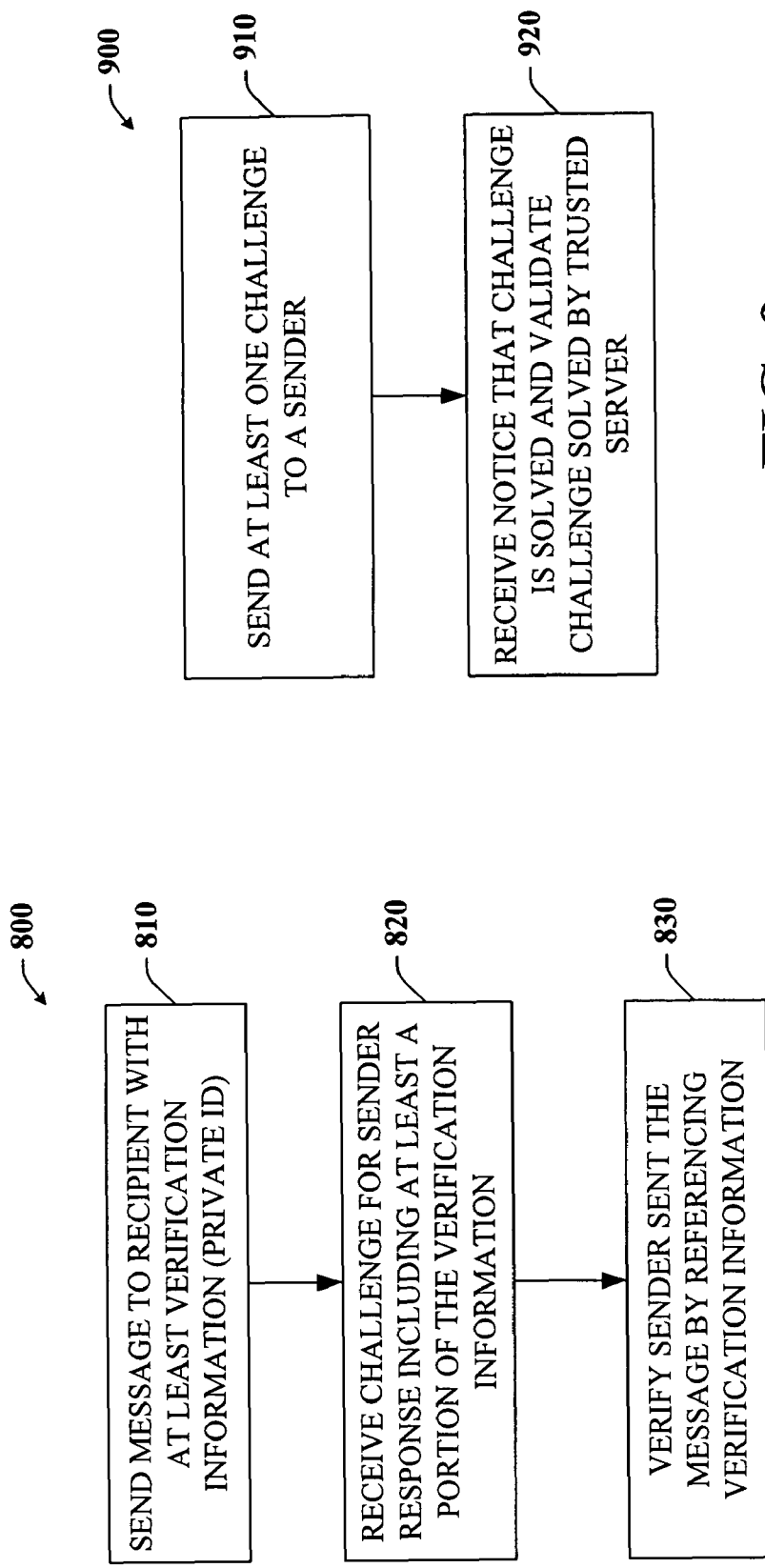

CHALLENGE RESPONSE SYSTEMS

TECHNICAL FIELD

This invention is related to systems and methods for spam prevention and more particularly to tracking and validating messages, their corresponding challenges, and challenge responses to facilitate maintaining secure communication channels between the sender, the recipient, and third party servers.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

A key technique utilized to thwart spam involves the employment of filtering systems/methodologies. One proven filtering technique is based upon a machine learning approach—machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., words and phrases in the subject and/or body of the message), such types of filters are commonly referred to as "content-based filters".

Despite the onslaught of such spam filtering techniques, many spammers have thought of ways to disguise their identities to avoid and/or bypass spam filters. Thus, conventional content-based and adaptive filters may become ineffective in recognizing and blocking disguised spam messages.

Instead of focusing on the recipient-end of spam, recent developments in anti-spam technology have concentrated on minimizing spammers' resources or their ability to send spam. For example, much of the current research involves inhibiting access to free email accounts from which massive amounts of spam can be sent. In particular, service providers have begun to require that potential account holders solve computational puzzles and/or human interactive proofs (HIPs) in order to obtain email accounts. Because computational puzzles and HIPs are designed to be too difficult for computers to solve but easy enough for humans, they tend to at least hinder new account sign-ups en mass which is typically performed by computers.

Computational puzzles have also been extended to individual senders. For example, recipients can require a sender to correctly solve a puzzle if they suspect the sender is a spammer. Theoretically, this practice is effective at catching disguised spammers; but unfortunately, it is not a foolproof tactic against their ever-adapting nature.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method that facilitates securing a challenge-response round-trip between senders and recipients. More specifically, the invention provides for tracking messages and challenges according to the respective sender and/or recipient so as to protect either party from spammer interference.

Suspicious message senders can prove that they are not spammers by "paying" with CPU cycles, solving HIPs or other puzzles that are too difficult for computers to solve, or by paying an amount of money (or equivalent) that would be too expensive for a spammer to afford. One problem with this approach is that spammers may attempt to send mail apparently from a "victim" user. This victim user receives the challenge. If the challenge is a HIP, the user may be fooled into solving it. If the challenge is a computational puzzle (to be solved automatically by the victim's computer), the victim's computer may be fooled into solving it. Thus, according to one aspect of the present invention, message senders can protect against rogue entities attempting to hijack or waste their CPU cycles by "signing" or "coding" their messages with a unique identifier (ID). One approach makes use of private IDs which facilitate verifying that incoming requests for CPU cycles (e.g., solve a challenge) are legitimate requests based on their messages and not the messages of an unknown third party stealing the senders' identities.

Another approach involves tracking outbound messages from any particular sender to make certain that the sender only responds to challenges or any other requests arising from the messages the sender actually sent. In particular, various individual or combinations of aspects of a message can be recorded and then tracked such as, for example, the subject, recipient, date, and the like.

Yet another aspect of the invention regards communication between users and third-party servers. HIP challenges in particular are typically solved using a web page, and since many users do not control their own web servers, the web page is typically hosted by a trusted third party. Unfortunately, this can provide some spammers with an opportunity to forge a response apparently from the trusted third party to the message recipient. Therefore, a secure communication channel is desired to transmit communications from the server to the recipient.

In practice, for example, when a third-party server is employed to validate puzzle results, as in the case of HIPs, a secure channel can be established through which the validation information can be sent. One approach involves having the third-party server sign a message cryptographically via a public key cryptographic signature system or a symmetric key cryptographic system. When using symmetric keys, for example, different recipients can employ different symmetric keys. The third-party server can then track the symmetric keys for the respective recipients to ensure that one recipient cannot forge a signature that would be trusted by another.

In other aspects of the invention, a recipient can send a challenge response in a message to the third-party server and include a random number in the message. If the server returns the random number along with validation information, then the recipient can verify that the validation information is in fact from the trusted server, assuming that eavesdropping on such communications is difficult. Furthermore, HTTP channels as well as the server's IP address can be utilized to keep communications secure between the third-party server and the recipient.

After a sender's response or solution to a challenge has been validated, the recipient may need assistance in retrieving the sender's original message. By embedding a cookie or some other type of ID in the challenge, which the recipient can extract from the solution, the recipient can store any data it expects to need during the message retrieval stage.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 8 is a flow diagram of an exemplary method that facilitates utilizing private IDs to determine that a sender actually sent a message for which the challenge has been issued in accordance with an aspect of the present invention.

FIG. 9 is a flow diagram of an exemplary method that facilitates secure communication between a challenge server and a recipient in accordance with an aspect of the present invention.

DETAILED DESCRIPTION OF THE INVENTION

Figure 1:
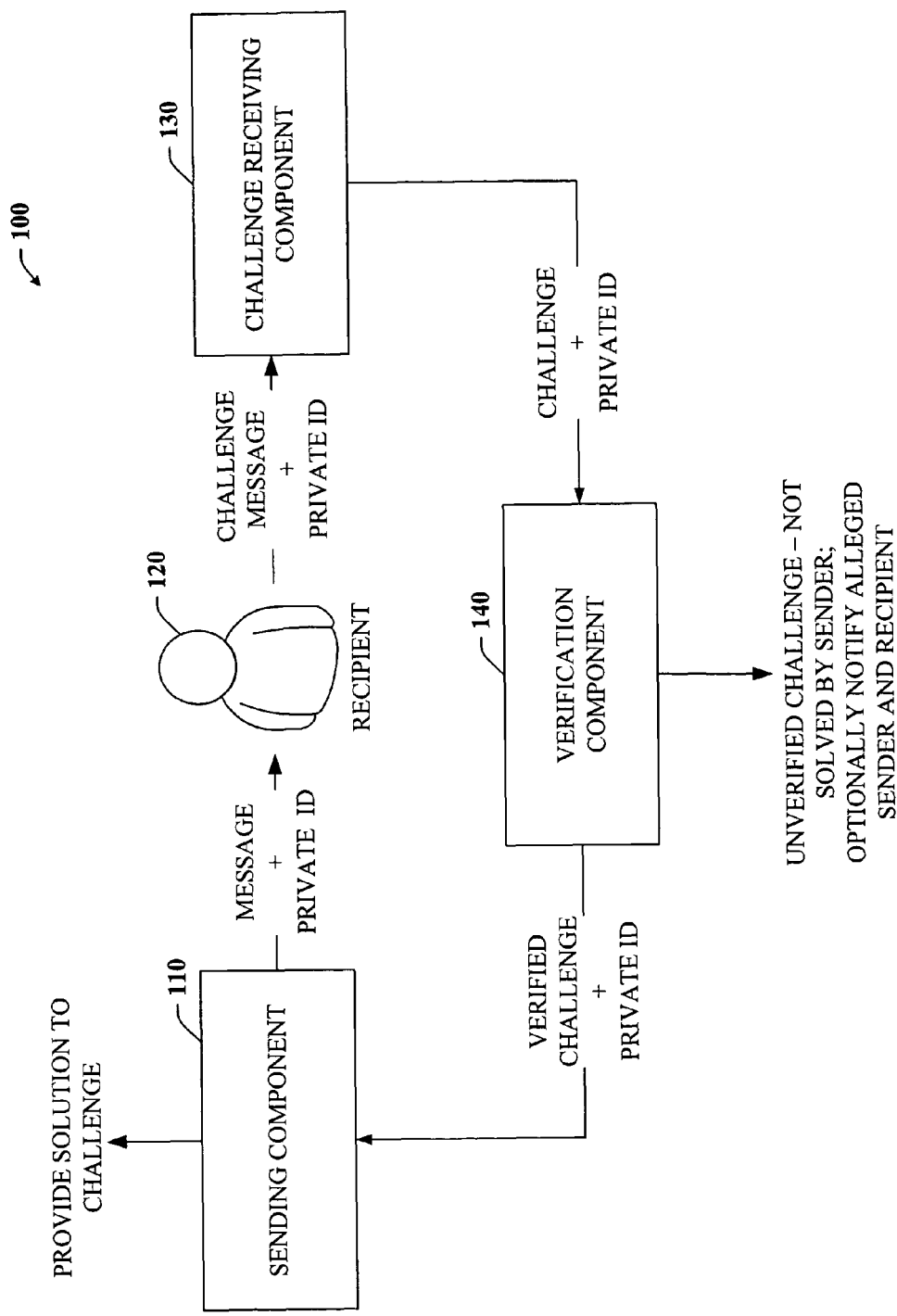
FIG. 1 is a schematic block diagram of a challenge-response system that facilitates verifying a sender's message as being from the sender in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating IDs and/or challenges for message recipients as well as challenge auto-responders (e.g., senders who program their account to auto-respond to challenges), for example. As used herein, the term "inference" refers generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference or conversation between two or more people (e.g., interactive chat programs and instant messaging programs) can also utilize the security features disclosed herein, since unwanted text can be electronically interspersed into normal chat messages as users exchange messages and/or inserted as a lead-off message, a closing message, or all of the above.

The present invention, as described in greater detail below, provides for securing and/or protecting challenge-response round trip technology. In general, challenge-response systems can be employed by message recipients to verify that a sender is not a spammer. If a sender is a suspected spammer, the recipient of the message can send a challenge to the apparent sender. The challenge can be included in a message sent via email that includes a request that the sender solve a computational challenge such as a computational puzzle or HIP before the sender's message is opened and read. Alternatively, the recipient's challenge can point the sender to a URL, for example, that is directed to a HIP and then require the sender to solve the HIP; or the message can offer the recipient a choice. In either scenario, spammers can intervene to spoof solutions or otherwise interfere with communications between the sender, recipient, and/or challenge system.

For example, a spammer or other malicious party can attempt to send a forged message apparently from a victim to a recipient. The recipient then sends a challenge to the victim to solve. If the victim solves it, then the spammer's message can be marked for the recipient to open and read. Thus, spammers can waste victims' (e.g., legitimate senders) CPU cycles by getting them to solve challenges unknowingly on their behalf or tricking them into solving HIPs or paying money. Furthermore, many senders desire to automate their responses to challenges to make the challenge-response round trip transparent to them as well as to the recipient. However, this could make the senders more vulnerable to denial-of-service (DoS) attacks which would also allow spammers to use CPU cycles on the sender's machine to pay for their spam.

Referring now to FIG. 1, there is illustrated a challenge-response system 100 that protects senders from solving challenges for messages they did not send for the benefit of spammers. The system 100 comprises a sending component 110 that can send messages (e.g., at least one message) to a recipient 120 from a sender. The sender's message can include information such as a private ID inserted thereto for each outgoing message to verify that the message sent purportedly from the sender is actually from the sender.

Private IDs can assist in authenticating the legitimacy of incoming challenges—particularly for senders who want to track and readily identify their own messages. Moreover, they can be particularly valuable for senders who automatically respond to challenges.

Cryptography can be employed to facilitate the generation of private IDs to maximize their security. They can comprise at least one type of tracking data to keep track of which challenges have been answered as well as their age to determine expiration. Various components including one or more of the following can be used to generate private IDs:

Date and/or time;
Number of recipients in message;
Counter;
Blank portion.

The date and/or time component included in the private ID can represent when the private ID or message was generated or when the message was sent by the sender. In addition, inclusion of the date and/or time can facilitate allowing the private ID to expire at some time in the future (e.g., 2 days, 1 week, etc.). The number of recipients can be used to determine the number of challenges that are needed for a particular message. For example, when a sender sends a message with 4 recipients, each of the 4 recipients should receive the message with a different private IP inserted thereto. Thus, the counter feature can make the private ID unique to ensure that a sender is not responding more than once to the same challenge. Finally, the blank portion of the private ID is included to increase the difficulty of guessing a valid private ID.

Private IDs can also comprise public or symmetric keys. The use of one over the other can depend on user or message system preferences. Because there are multiple ways to send messages from the same user account, the system 100 or a component thereof can confirm that each of these access points have access to the same key or to the same list of keys. For example, to make certain that the same key is used, the system or component thereof can ask the user to manually enter a password or pass phrase on each machine that appends private IDs or some other type of signature. The password, for example, can be used indirectly or directly to generate the key. Alternatively or in addition, the key can be stored in a secure folder on a server or in a message, both of which can be hidden. When communicating between two clients at different locations, a special message can be generated having a unique format to hide the key. The key can also be passed using a secure pathway and/or be encrypted with another key or password. Finally, one key (e.g., an infocard) can be used to generate another key.

Referring again to the system 100, the recipient 120 can request the sender to solve a challenge by way of a challenge receiving component 130 when the recipient 120 receives the message. Essentially, the challenge receiving component 130 can send a challenge with the message's private ID included in the challenge to the sender (110) via a verification component 140. The verification component 140 can verify that the sender sent the message by examining the private ID included in the challenge. If the private ID is determined to be valid, then the sender can respond to the challenge (automatically or manually) with a somewhat stronger guarantee that the challenge is legitimate.

Otherwise, if the private ID is deemed invalid or is missing, the challenge can be sent to a spam filter (not shown). If the verdict is good, then the challenge can be displayed in the sender's inbox, depending on whether the recipient still requires the challenge to be solved. Optionally, the recipient and/or the sender can be notified of the invalid or missing verification information (e.g., private ID).

In some cases, senders may receive messages purportedly from them but which are actually not from them. As can be imagined, the verification information may not match since such messages are typically from spammers who have spoofed the From: header of a sender's message. Such messages can be given differential treatment apart from other messages received by the sender. For example, a filter can be trained to move such messages to a special folder for later investigation. If the sender also makes use of a challenge-response system for incoming messages, the challenge-response system can flag these messages and request user action before initiating a challenge. In addition, the challenge-response can be programmed to not accept or block responses from auto-responders for this type of message.

As an alternative to the system 100, a tracking system can be employed by the sender to track every or nearly every outbound message that is sent and make sure that the sender only responds to challenges for messages that were actually sent. This can be accomplished in part by tracking one or more different types of information about the message. Exemplary types of information include but are not limited to the subject, number and/or name of recipients, date of message, size of message, etc. At least a portion of this information can then be included in the challenge message to verify that the challenge has been properly sent to the actual sender.

Figure 2:
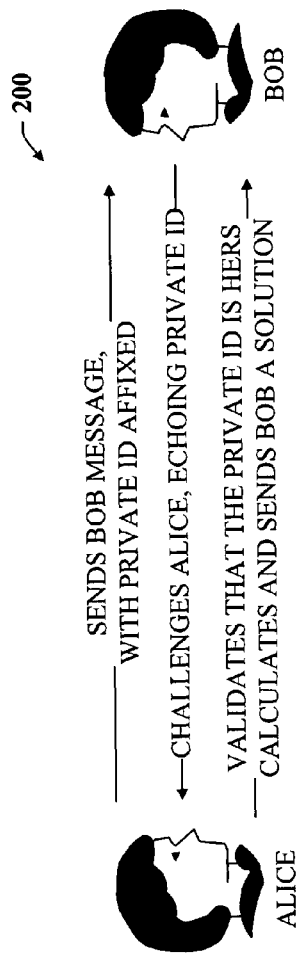
FIG. 2 is a schematic diagram demonstrating a challenge-response round trip integrated with employment of private IDs in accordance with an aspect of the present invention.
Figure 3:
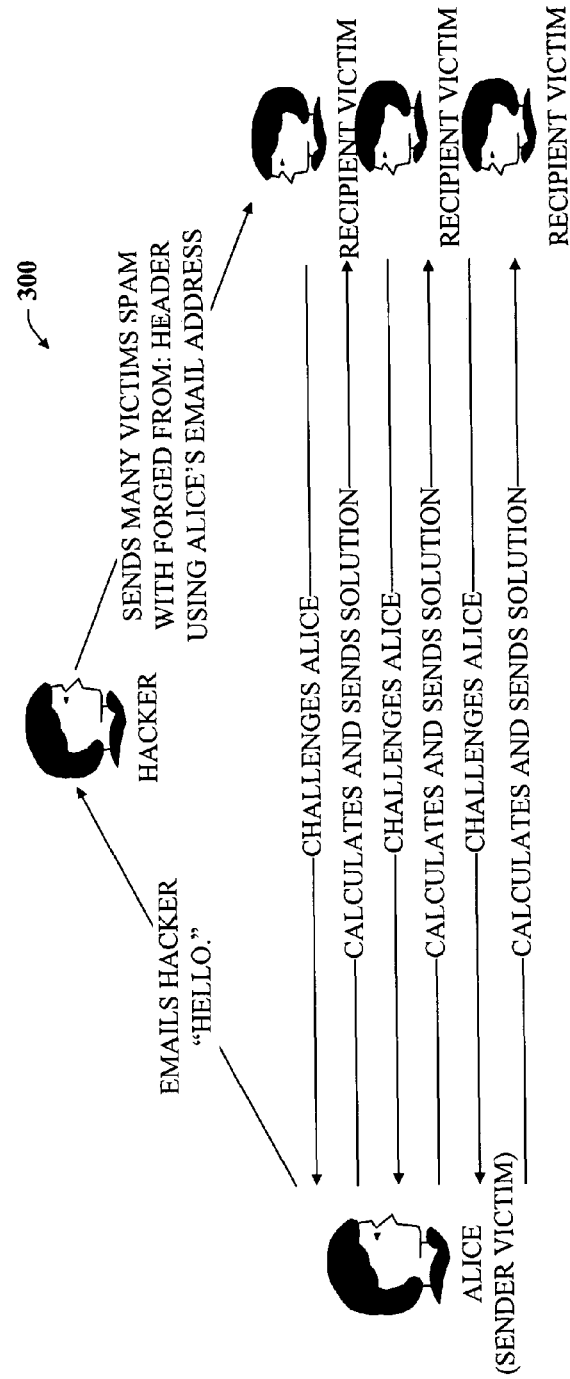
FIG. 3 is a schematic diagram demonstrating possible consequences of not using private IDs in accordance with an aspect of the present invention.

Some of the effects of employing system 100 are pictorially demonstrated in schematic diagrams 200 and 300 in FIGS. 2 and 3, respectively. In FIG. 2, Alice sends Bob a message with a private ID affixed to the message. In fact, every message sent by Alice includes a different private ID. Bob must then echo or repeat the private ID in a challenge sent to Alice. Alice can validate that the private ID belongs to her and then sends Bob a solution to the challenge. Alternatively, Bob (or Bob's server) could simply add the value one to the random number it receives, and then Alice (the sender) could check to determine if the received number is exactly one greater than the sent number.

FIG. 3 demonstrates how a sender's machine can be easily hijacked by a malicious party (Hacker) or spammer when not using private IDs or some other type of verification information and building challenge limits into them. As shown, Alice sends an innocuous message to Hacker. In the case of a spammer, the message could be "please remove me from your list". Hacker then sends many recipient victims spam with forged From: header using Alice's email address. The recipient victims then send challenges to Alice. Unaware that these are not for her own messages, she sends solutions for them back to the recipient victims. Hence, Hacker can send spam to a nearly unlimited number of victims for "free". Thus, by using private IDs, Alice can limit the number of victims who will be sent spam paid for by Alice's CPU cycles.

Figure 4:
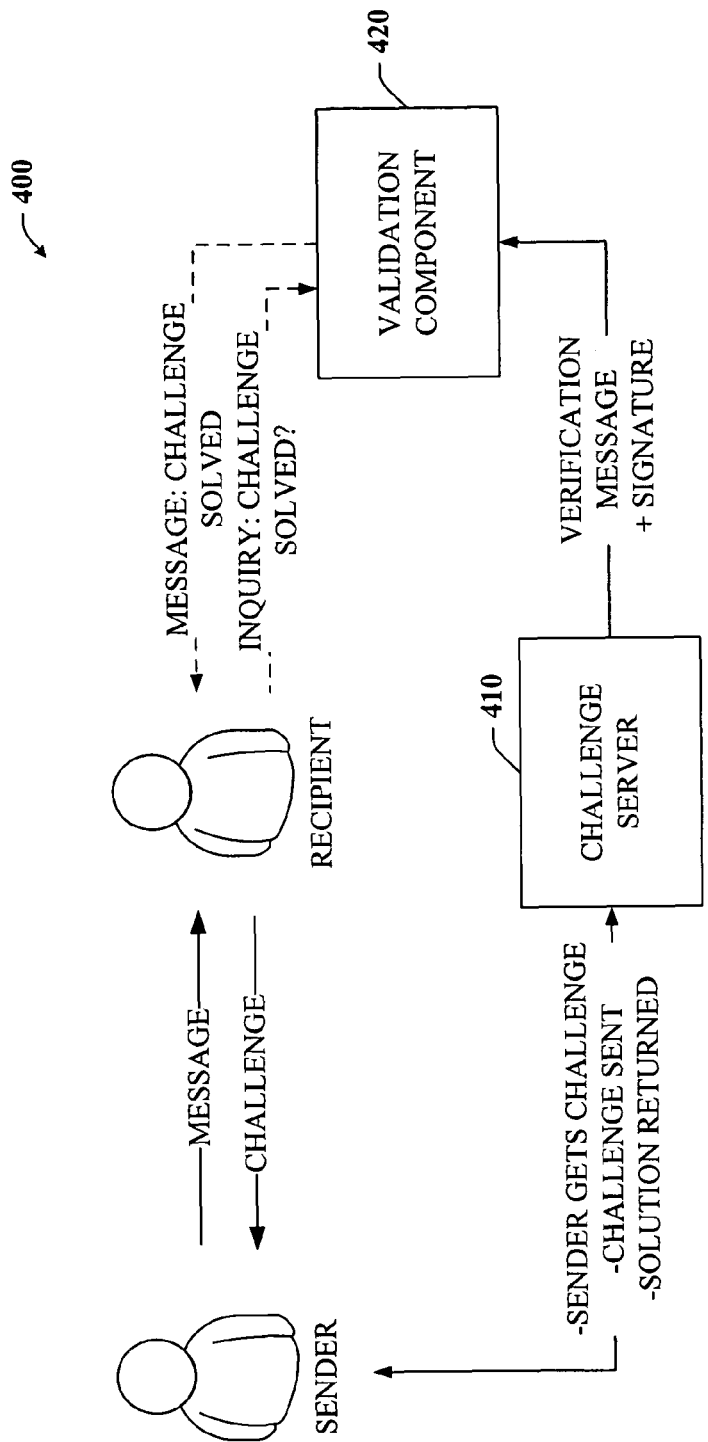
FIG. 4 is a schematic block diagram of a challenge-response system that facilitates securing communication between a trusted third party server or validation component and a recipient in accordance with an aspect of the present invention.

Turning now to FIG. 4, there is illustrated a challenge response system 400 that facilitates secure communication between third-party challenge servers (e.g., a HIP or micropayment server) and recipients who require confirmation that the challenges are solved correctly by the sender. Such a system 400 can be particularly useful when utilizing HIP or micropayment challenges. For example, when sending a HIP challenge via email, the sender receives a message from (or on behalf of) the recipient that includes a link to a HIP webpage hosted on a third-party HIP server. The webpage can include an embedded image containing a word that the user (sender) needs to transcribe. The sender solves the HIP and the HIP server can record the solution.

One problem with hosting puzzles on third-party HIP servers is that it is possible for spammers to spoof communications from the third-party HIP server, making it seem like the HIP has been solved when in fact, it has not been solved. There is also some concern of how a HIP server is to contact an email client or email server to tell the client or server (on recipient's end) that the HIP has been solved. Many email clients sit behind firewalls and the only reliable way to contact them is via email. Unfortunately, email is typically insecure; and for at least this reason, secure channels via email are desirable.

As shown in the figure, a sender can initially send a message to a recipient. The recipient can respond to the sender with a message requesting the sender to solve a challenge such as a HIP or make a micropayment. Thus, the message can include a URL that directs the sender to a challenge website hosted by a challenge server 410. Once the sender solves the challenge (or provides the necessary micropayment), the challenge server 410 can generate a "secure" server message. The server message can then be validated to ensure that the message came from a trusted server (and that its content can be trusted by the recipient).

In order to effectively validate the server's message, a validation component 420 can employ several different techniques. In one instance, the server 410 can sign its messages with a type of cryptographic ID attached to each outgoing message. The ID can change for each message it sends. The validation component 420 can then determine whether the ID appearing in the message matches that of the server 410. The ID or digital signature of the message can be created by using either a public key or symmetric key cryptographic system. When using symmetric keys, different recipients should have different keys to mitigate or prevent one recipient from forging a signature that may be trusted by another. The server 410 can keep track of the pertinent symmetric keys for each recipient. Thus, the server 410 can return the correct ID or key of the message.

In another instance, the server can track nearly all if not all symmetric keys for all recipients in its database. The server can sign its messages with the recipient's symmetric key that is specific to this particular pairing (of recipient to server). In some cases, a secure email channel can be used such as S/MIME.

In yet another instance, the recipient can verify the source of a server message. For example, after receiving the message from the server 410, the recipient can send the message with a random number back to the server 410. The server 410 can then be asked to return the message. If the returned message has the correct number, then the server 410 can be identified as the trusted server and the server's message is essentially authenticated. Only the actual server 410 or someone who can eavesdrop on this conversation (not a typical spammer) can return the correct random number.

Upon receiving a response via email, the recipient can also open a channel over HTTP (which is usually not blocked by firewalls) and verify that the response was valid. It is much harder to fake an HTTP response than to fake email. Finally, in some cases, the recipient can determine the IP address that the HIP-response email used, and verify that this IP address corresponds to the HIP server.

Moreover, "signed" messages can verify the legitimacy of incoming notifications. For example, if the user's email client is an application on a PC, a HIP server might send a digitally signed message to the email client to confirm that the HIP was correctly solved. Or, if the user's email client is a web-based client, the HIP server might send a digitally signed message communicated via a secure private tunnel, communicated via a signed web service, or other similar secure means.

Figure 5:
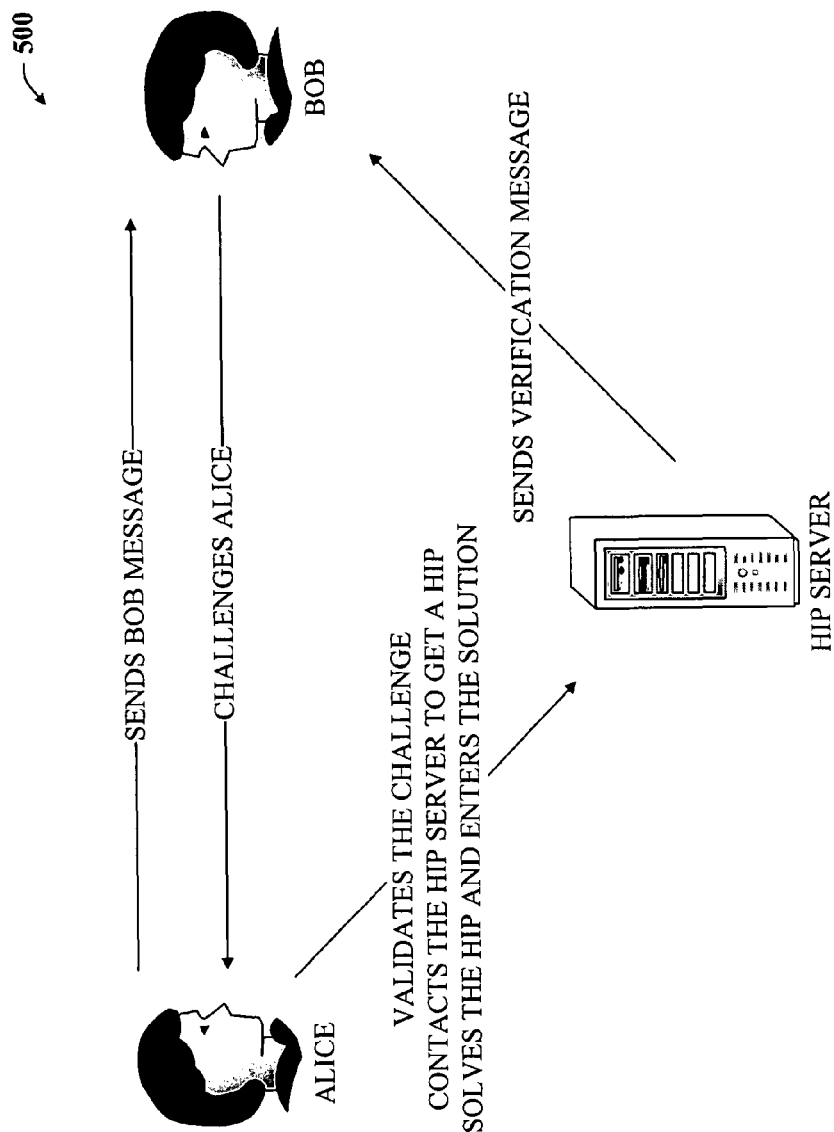
FIG. 5 is a schematic diagram demonstrating an exemplary pathway between a trusted challenge server and a recipient in accordance with an aspect of the present invention.

FIG. 5 pictorially demonstrates at least one aspect of the system 400, supra. As shown in the diagram 500, Alice sends Bob a message and then Bob challenges Alice. Alice can validate the challenge (as corresponding to a message she actually sent) and then contact the challenge server (e.g., HIP server) to get a HIP to solve. The solution can be returned to the HIP server—at which time, it can be authenticated to be sure that it came from the trusted HIP server.

Figure 6:
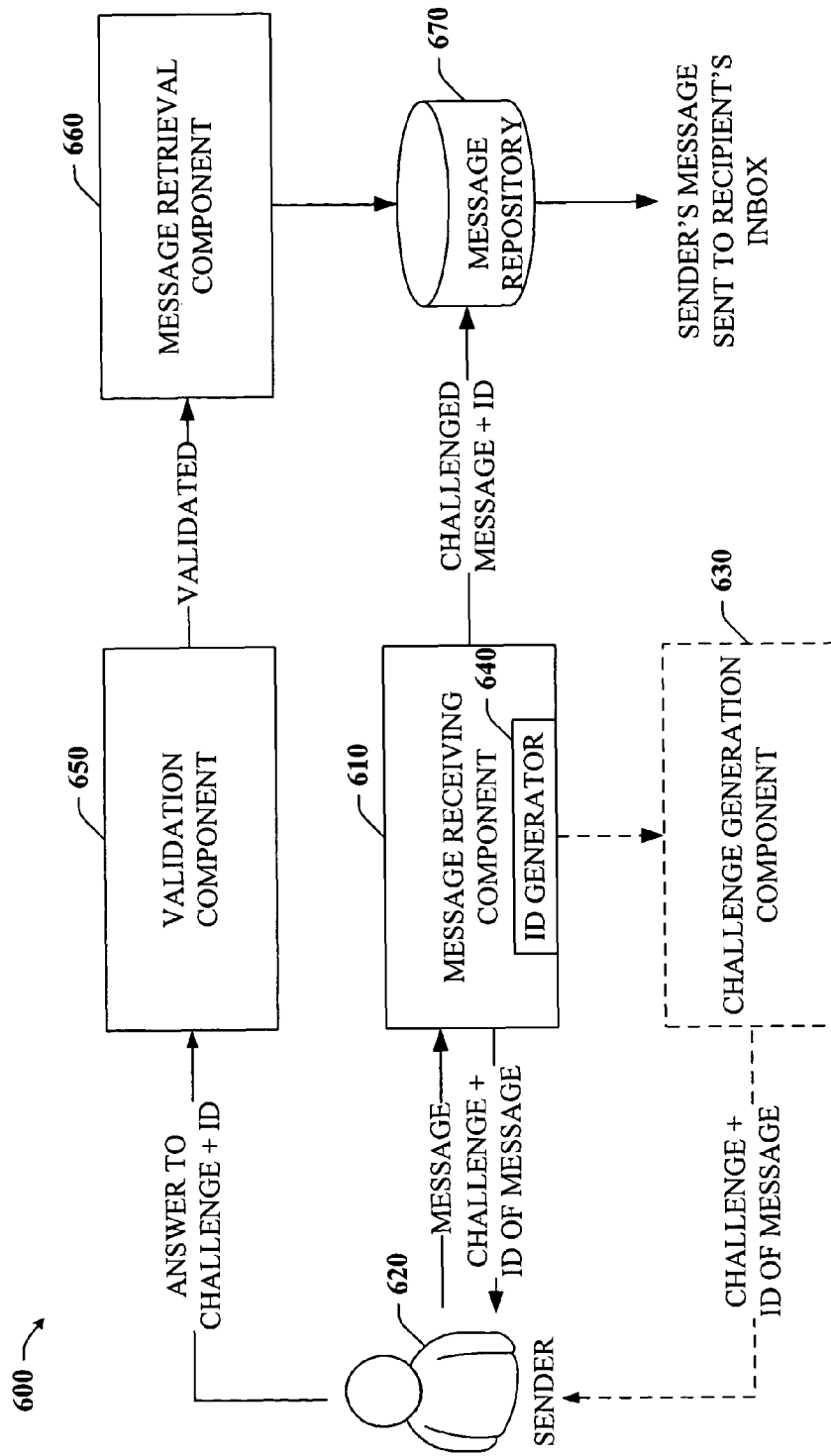
FIG. 6 is a schematic block diagram of a challenge-response system that facilitates secure retrieval of messages from senders who have successfully answered challenges in accordance with an aspect of the present invention.

Turning now to FIG. 6, there is illustrated a challenge-response system 600 that facilitates retrieving a sender's message once the sender has correctly solved or performed a challenge. The system 600 comprises a message receiving component 610 that can receive messages sent from a sender 620. The recipient can decide to challenge the sender 620. Thus, the recipient can optionally signal a challenge generation component 630 to provide a challenge to the sender 620 by way of a message having a unique ID appended thereto (ID generator 640). A challenge echoing the same ID of the message can be generated and affixed to the challenge as well (e.g., in the challenge message headers).

Otherwise, such as in the case of HIP challenges, the recipient can send a challenge message to the sender and include a unique ID and a link to a challenge website. The particular challenge can be accessed by clicking on the link and then submitting the solution via the webpage. The hosting server can record the solution and user (sender) as well as the unique ID that appeared in the challenge message. This unique ID can be subsequently employed to verify the identity of the hosting server (by a validation component 650 as well as to facilitate locating the sender's message (by a message retrieval component 660) stored in a message repository 670—since the sender's original message does not accompany the challenge-related communications.

After the ID is generated for the sender's message and included in the challenge message, the sender's message can be sent to the message repository 670 at least until the recipient's message system (e.g., email program) has been notified that the corresponding challenge has been successfully solved.

Message retrieval can be initiated by recipient action or upon recipient request. Alternatively, the sender's correct and verified response can automatically trigger the retrieval component 660 to move the appropriate message to the recipient's inbox.

Figure 7:
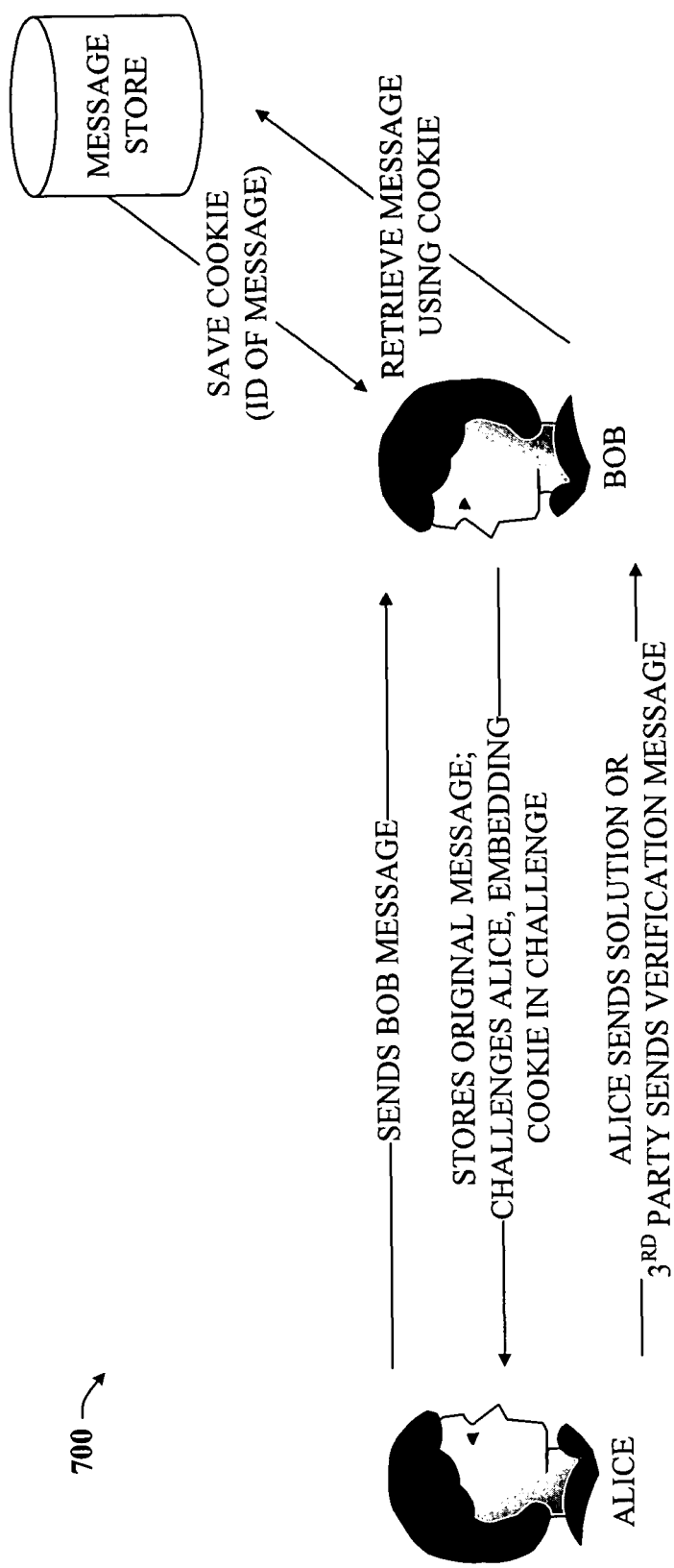
FIG. 7 is a schematic diagram demonstrating a recipient's retrieval of a sender's message in accordance with an aspect of the present invention.

FIG. 7 provides further illustration of the system 600. As shown in this model 700 of the challenge-response round trip, when the challenger or recipient (Bob) receives the sender's (Alice) solution to the puzzle and sees that it is valid, he then somehow has to find Alice's original message now that he knows that the message is legitimate. One approach is to have a "cookie" included in part of Bob's challenge which contains some data which will assist Bob in remembering where Alice's original message was stored. For example, it could contain the internal MAPI message-ID of the original message, for which Bob can subsequently search his message store. This data may or may not be encrypted or otherwise disguised.

Alternatively, Alice can re-attach her original message to the solution she sends to Bob. In this case, the encrypted cookie for correlation can be stored into the private ID that was described, supra, in FIG. 1, so that when Alice gets Bob's challenge, she knows what message was challenged. Thus, the cookie or ID used by the recipient to correlate messages to solved challenges can be a part of the sender's private ID used to identify the sender's messages to the sender.

Figure 10:
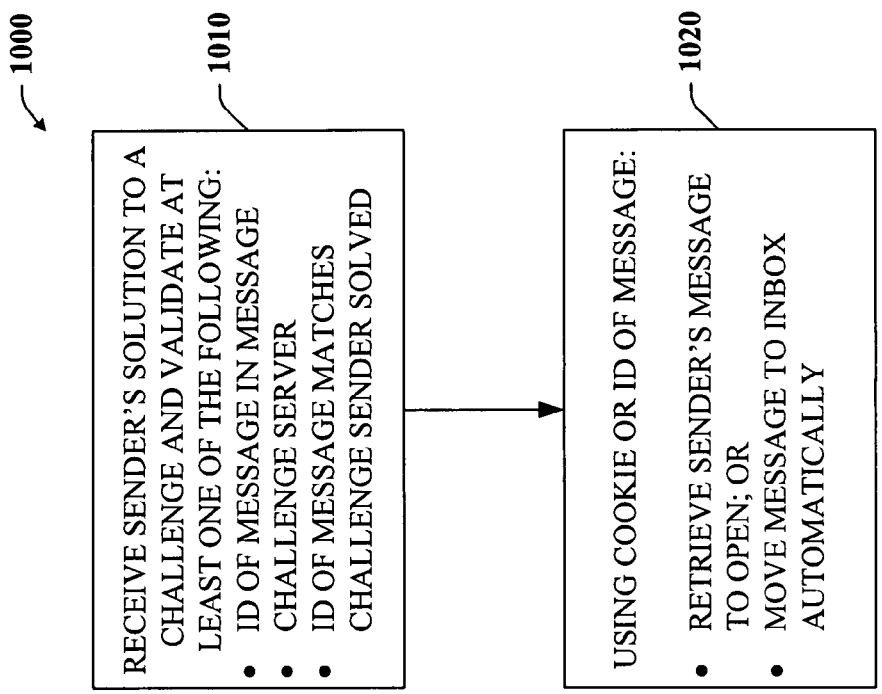
FIG. 10 is a flow diagram of an exemplary method that facilitates retrieving sender messages once they have correctly solved the respective challenges in accordance with an aspect of the present invention.

Various methodologies in accordance with the subject invention will now be described via a series of acts as shown in FIGS. 8-10. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 8, there is a flow diagram of an exemplary methodology 800 that facilitates a secure challenge-response round trip in part by allowing a sender to verify that challenges correlate to actual messages. The methodology 800 comprises sending at least one message to a recipient at 810. The message can comprise information, at least a portion of which can be used for verification such as a private ID or other type of ID. The ID can be appended to at least one message header or to any other portion of the message so long as it can be tracked by the sender. The use of private IDs can be particularly useful with respect to autoresponders of challenges. By utilizing private IDs, senders can be more confident that their autoresponses will not have deleterious effects of mass spam dissemination even if they are fooled by a spammer into solving a challenge for the spammer.

At 820, at least one challenge can be received and prepared to be sent to the message sender to assist the recipient of the message in verifying that the sender is not a malicious party such as a spammer. In particular, the challenge can include at least a portion of the verification information. When the challenge is sent to the sender, the sender can verify that the challenge corresponds to one of the sender's messages by way of the verification information at 830. If the verification information does not match or is missing, the challenge can be sent to a filter and a resulting verdict can dictate the appropriate action to take. For example, if the verdict is "good", then the challenge can be moved to the sender's inbox to be solved. Other treatments of the challenge can be performed as well such as notifying the sender and/or the recipient of the deficient verification information.

Referring now to FIG. 9, there is illustrated a flow diagram of an exemplary methodology 900 that facilitates securing communication between a challenge (HIP) server and a recipient by way of an email communication channel. The methodology 900 comprises sending at least one HIP-based challenge to a sender at 910. At 920, notice is received such as by the recipient that the challenge has been solved and a secure message can be sent to the recipient with the related information. The secure message can include a digital signature and/or cookie which can be embedded in the HIP URL. The digital signature of the message should match the public key of the HIP server. The cookie can be returned here so that the recipient (challenger) can retrieve the original message. The secure message from the HIP server can be validated to be sure that it is coming from a valid and trusted server (e.g., HIP server).

Turning to FIG. 10, there is illustrated a flow diagram of an exemplary method 1000 that facilitates retrieving messages that correlate to senders who have responded correctly to the respective challenges. The method 1000 involves receiving a sender's solution to a challenge at 1010 and then validating at least one of the ID of the message to make certain that the ID is in the message, the challenge server, and/or that the ID of the message matches the challenge the sender solved.

Once the appropriate information has been validated, the recipient can be notified that the sender has answered the challenge correctly; and thus can retrieve the respective message from a message repository at 1020. Alternatively, the recipient's message system can be set to automatically move the appropriate message into the inbox as soon as the relevant information has been validated. To facilitate the retrieval process, a cookie, for example, can be employed to make it easier for the message system to retrieve the original message.

Figure 11:
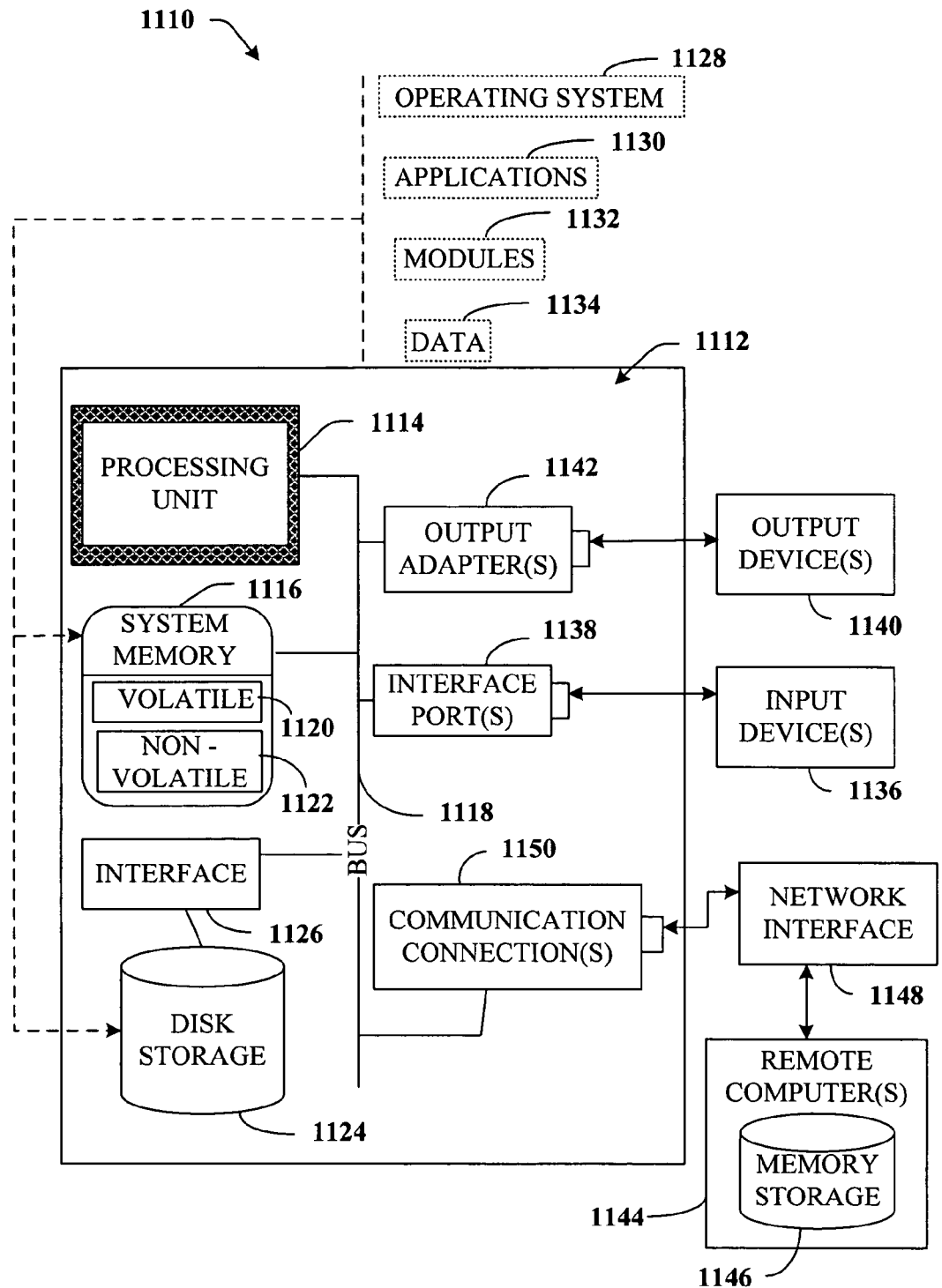
FIG. 11 is a schematic block diagram of an exemplary communication environment in accordance with the present invention.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples the system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node, and the like, and typically includes many or all of the elements described relative to computer 1112. For purposes of brevity, only a memory storage device 1146 is illustrated with remote computer(s) 1144.

Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5, and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Non-transitory computer storage media having a challenge-response system embodied thereon including computer-executable instructions that, when executed, perform a method for mitigating dissemination of spam, the system comprising:

a sending component that sends messages for a sender, wherein each message including verification information, at least a portion of which is unique to each message and is used for verification;

a challenge receiving component at the sender that receives challenges; and a verification component that verifies for the sender that each received challenge is associated with a message that the sender sent in part by examining the received challenge for matching verification information, wherein the verification component moves challenges including matching verification information to an inbox of the sender and the verification component moves challenges not including matching verification information to a spam folder.

2. The media of claim 1, further comprising a component that responds to verified challenges and does not respond to unverified challenges.

3. The media of claim 1, the verification component signs or encrypts information about each of the sender's outbound messages and includes at least a portion of that information in the challenge.

4. The media of claim 3, the verification component employs a key stored on a server to sign or encrypt the information.

5. The media of claim 4, the key employed is the same for all clients and/or for the recipient's server.

6. The media of claim 1, an information storage component that stores at least some information about substantially all of the sender's outbound messages.

7. The media of claim 6, the information storage component assigns and stores a unique ID for each message for all of the sender's outbound messages.

8. The media of claim 6, the message ID is used to correlate a sender's message with a challenge that was received for the message.

9. The media of claim 6, the information comprises at least one of a subject, recipient, unique ID or random number, number of recipients, number of expected challenges, and date of the message.

10. The media of claim 1, the verification component communicates to the sender an indication that the challenge is associated with a message that originated from the sender in accordance with the verifying the verification information.

11. The media of claim 1, the verification component communicates to the sender an indication that the challenge is associated with a message that did not originate from the sender based at least in part upon the verification information not being verified.

12. The media of claim 1, the challenge comprises a micropayment.

13. The media of claim 1, the challenge comprises a computation puzzle.

14. Non-transitory computer storage media having a challenge-response system embodied thereon including computer-executable instructions that, when executed, perform a method for facilitating spam prevention, the system comprising:

a challenge generation component that sends at least one challenge to a message sender before the sender's message is opened by the recipient; and a validation component for the message sender that verifies that the at least one challenge is in response to a message sent from the sender based upon unique tracking information sent with each message sent from the sender and stored for each message sent by the sender, the validation component examining each of the at least one challenge for matching tracking information, wherein the verification component moves challenges including matching tracking information to an inbox of the sender and automatically responds with a correct response to the challenge, and the verification component moves challenges not including matching tracking information to a spam folder.

15. The media of claim 14, the challenge is a micropayment and the validation component receives a message confirming payment from a micropayment server.

16. The media of claim 14, the challenge is a HIP and the validation component receives a message confirming a solution was received from a HIP server.

17. The media of claim 14, the email communication channel comprises a signature system, whereby an email is sent to the recipient using at least one signature type.

18. The media of claim 17, wherein the signature type utilizes a public key cryptographic system.

19. The media of claim 17, the signature type further comprises a symmetric (private) key cryptographic system comprising a plurality of symmetric keys corresponding to different recipient systems.

20. The media of claim 14, the communication channel employs any one of signing or encryption.

21. The media of claim 14, further comprising an email authentication component that authenticates validity of the email by a round-trip communication to the HIP server.

22. The media of claim 21, the round-trip communication is via email.

23. The media of claim 21, the round-trip communication is via HTTP.

24. The media of claim 14, the validation component verifies responses via IP addresses in the respective responses.

25. A computer-implemented method that facilitates a secure challenge-response round trip comprising:

sending, utilizing a first computing process, at least one message to at least one recipient, the message comprising information, at least a portion of which includes verification information unique to the message;

receiving, utilizing a second computing process, a challenge for sender response; and verifying, utilizing a third computing process, that the challenge is in response to a message sent by the sender by examining the challenge for matching verification information, wherein the challenge is moved to an inbox of the sender when the challenge includes matching verification information and the challenge is moved to a spam folder when the challenge does not include matching verification information;

wherein the first, second, and third computing processes are executed by one or more computing devices.

26. The method of claim 25, verifying that the sender sent the message comprises signing or encrypting information about each outbound message sent by the sender and including a corresponding signature or encryption in the challenge.

27. The method of claim 26, the signing or encrypting comprises employing a key stored on a server.

28. The method of claim 25, the verification information comprises an ID of the message that is utilized to correlate incoming challenges with the message that was challenged.

29. The method of claim 25, further comprising:

receiving a server message from a challenge server that indicates that the challenge was solved by the sender, the server message comprising an ID that identifies the challenge server and at least one of the sender or the sender's message; and validating that the server message came from a trusted server at least in part by the ID via email communication.

30. The method of claim 29, validating that the server message came from the trusted server further comprises:
   sending a message including a random number back to the server that sent the server message; and
   determining whether the server returns a message with any one of the following to the recipient: the same random number or a number derived from the random number.

31. The method of claim 29, further comprising using a signature system to maintain authenticity of messages whereby outbound messages sent from a recipient are signed using a public key or symmetric key cryptographic system that comprises a plurality of symmetric keys for each different recipient.

32. The method of claim 29, further comprising retrieving the sender's message once the challenge is solved and validated; and moving the message to the recipient's inbox.

33. Non-transitory computer storage media having a challenge-response system embodied thereon including computer-executable instructions that, when executed, perform a method for facilitating a secure challenge-response round trip, the system comprising:
   means for sending at least one message to at least one recipient, the message comprising information, at least a portion of which includes verification information unique to the message;
   means for receiving a challenge for sender response, wherein the verification information unique to the at least one message is received with the challenge; and
   means for verifying that the challenge is in response to a message sent by the sender by examining the challenge for matching verification information, wherein the challenge is moved to an inbox of the sender when the challenge includes matching verification information and the challenge is moved to a spam folder when the challenge does not include matching verification information.

34. The media of claim 33, further comprising:
   means for receiving a server message from a challenge server that indicates that the challenge was solved by the sender, the server message comprising an ID that identifies the challenge server and at least one of the sender or the sender's message; and
   means for validating that the server message came from a trusted server at least in part by the ID via email communication.

35. The media of claim 34, validating that the server message came from the trusted server further comprises:
   means for sending a message including a random number back to the server that sent the server message; and
   means for determining whether the server returns a message with any one of the following to the recipient: the same random number of a number derived from the random number.

36. The media of claim 34, further comprising means for retrieving the sender's message once the challenge is solved and validated; and moving the message to the recipient's inbox.

* * * * *